United States Patent [19]
Xie et al.

[11] Patent Number: 5,750,288
[45] Date of Patent: May 12, 1998

[54] MODIFIED LITHIUM NICKEL OXIDE COMPOUNDS FOR ELECTROCHEMICAL CATHODES AND CELLS

[75] Inventors: Like Xie; David T. Fouchard, both of Madison, Wis.; Walter B. Ebner, Gastonia, N.C.; El-Sayed Megahed, Madison, Wis.

[73] Assignee: Rayovac Corporation, Madison, Wis.

[21] Appl. No.: 538,252

[22] Filed: Oct. 3, 1995

[51] Int. Cl.$^6$ ..................... H01M 4/02
[52] U.S. Cl. .............. 429/229; 429/223; 429/2 R; 423/594; 423/641; 420/550
[58] Field of Search .................. 429/218, 223, 429/229; 423/618, 622, 624, 625, 641, 594; 420/549, 550

[56] References Cited

U.S. PATENT DOCUMENTS

| | | | |
|---|---|---|---|
| 3,873,369 | 3/1975 | Kamenski | 136/83 |
| 3,970,473 | 7/1976 | Roth et al. | 136/83 |
| 4,041,220 | 8/1977 | Armand | 429/191 |
| 4,115,633 | 9/1978 | Kasper et al. | |
| 4,163,829 | 8/1979 | Kronenberg | 429/194 |
| 4,198,476 | 4/1980 | Di Salvo et al. | 429/194 |
| 4,302,518 | 11/1981 | Goodenough et al. | 429/104 |
| 4,357,215 | 11/1982 | Goodenough et al. | 204/2.1 |
| 4,423,125 | 12/1983 | Basu . | |
| 4,497,883 | 2/1985 | Murray . | |
| 4,604,334 | 8/1986 | Tarascon . | |
| 4,615,959 | 10/1986 | Hayashi et al. | |
| 4,702,977 | 10/1987 | Hiratsuka et al. | 429/194 |
| 4,710,439 | 12/1987 | Tarascon | 429/194 |
| 4,725,422 | 2/1988 | Miyabayashi et al. | 423/445 |
| 4,751,159 | 6/1988 | Tarascon . | |
| 4,863,818 | 9/1989 | Yoshimoto . | |
| 4,894,301 | 1/1990 | Dyer et al. | |
| 4,902,589 | 2/1990 | Dahn et al. | |
| 4,935,688 | 6/1990 | Mistry et al. | |
| 4,943,497 | 7/1990 | Oishi et al. | |

(List continued on next page.)

FOREIGN PATENT DOCUMENTS

| | | |
|---|---|---|
| 0017400 | 10/1980 | European Pat. Off. . |
| 0345707 | 12/1989 | European Pat. Off. . |
| 0 682 377 A1 | 11/1995 | European Pat. Off. . |
| 63-114056 | 5/1988 | Japan . |
| 63-299056 | 12/1988 | Japan . |
| 01120765 | 7/1989 | Japan . |
| 2-54866 | 2/1990 | Japan . |
| 2-56871 | 2/1990 | Japan . |
| 2-66856 | 3/1990 | Japan . |
| 2-68855 | 3/1990 | Japan . |
| 2-68859 | 3/1990 | Japan . |
| 2-68868 | 3/1990 | Japan . |
| 90/132924 | 11/1990 | WIPO . |

OTHER PUBLICATIONS

Thomas et al., Material Resources Bulletin, U.S.A., 1985. (month N/A).

Kanno et al., Journal of Power Sources, Japan, 1989. (month N/A).

(List continued on next page.)

*Primary Examiner*—M. Nuzzolillo
*Attorney, Agent, or Firm*—Grady J. Frenchick; Stroud, Stroud, Willink, Thompson & Howard

[57] ABSTRACT

The present invention relates to electrochemical cells, and more particularly to secondary lithium intercalation cells. Nickel is employed as a component "M" in an active cathode material represented by the formula $Li_xM_yO_z$, where "x" and "y" are generally about 1, and "z" is generally about 2. In the present invention "$M_y$" is divided into two components, a first major component of nickel, corresponding to at least 70% of "$M_y$," and a second minor component comprising at least one of a non-transition metal selected from the group consisting of aluminum, gallium, tin, and zinc, and in some embodiments at least one transition metal selected from the group consisting of scandium and the Period 5 metals having atomic numbers between 39 and 42. A two-stage reaction process for making the compounds of the active cathode materials of the present invention is described.

33 Claims, 11 Drawing Sheets

U.S. PATENT DOCUMENTS

| | | | |
|---|---|---|---|
| 4,945,014 | 7/1990 | Miyabayashi et al. | |
| 4,978,600 | 12/1990 | Suzuki et al. | |
| 4,980,080 | 12/1990 | Lecerf et al. | |
| 4,980,250 | 12/1990 | Takahashi et al. | |
| 5,110,696 | 5/1992 | Shokoohi et al. | |
| 5,135,732 | 8/1992 | Barboux et al. | 423/593 |
| 5,192,629 | 3/1993 | Guyomard et al. | 429/197 |
| 5,196,279 | 3/1993 | Tarascon et al. | |
| 5,211,933 | 5/1993 | Barboux et al. | 423/596 |
| 5,225,297 | 7/1993 | Garcia-Alvorado et al. | 429/220 |
| 5,256,504 | 10/1993 | Okuno et al. | 429/197 |
| 5,264,201 | 11/1993 | Dahn et al. | 423/594 |
| 5,286,582 | 2/1994 | Tahara et al. | 429/218 |
| 5,310,553 | 5/1994 | Simon et al. | |
| 5,401,599 | 3/1995 | Tahara et al. | 429/218 |
| 5,478,674 | 12/1995 | Miyasaka. | |
| 5,595,842 | 1/1997 | Nakane et al. | 429/223 |

OTHER PUBLICATIONS

Tanimoto et al., Chemical Abstracts, 1989, vol. 43, "Alternative Cathode Materials for a Molten Carbonate Fuel Cell." (month N/A).

Whittingham, J. Electrochem. Soc., vol. 123, No. 3, pp. 315–320, 1976, "The Role of Ternary Phases in Cathode Reactions." (month N/A).

Delmas et al., Journal of Power Sources, 43–44, pp. 595–602, 1993, "The Cycling Properties of the Lithium Nickel Cobalt Oxide Electrode." (month N/A).

Rossen et al., Solid State Ionics, vol. 57, pp. 311–318, "Structure and Electrochemistry of Lithium Manganese Nickel Oxide." (month N/A).

Notes from Technical Presentation of Nagaura, U.S.A., 1990. (month N/A).

Dahn et al., Solid State Ionics, U.S.A., 1990. (month N/A).

Ebner et al., Solid State Ionics, U.S.A., 1994. (month N/A).

Dyer et al., "Alkali Metal–Nickel Oxides of the Type $MNiO_2$", J. Amer. Chem. Soc., pp. 1499–1503 (1954) (month N/A).

Goodenough et al., "Some Ferrimagnetic Properties of the System $Li_xNi_{1-x}O$", J. App. Phys., vol. 29, No. 1, pp. 382–383 (1958) (month N/A).

Goodenough et al., "Some Magnetic and Crystallographic Properties of the System $Li_xNi_{1-2x}Ni_xO$", J. Phys. Chem. Solids, vol. 5, pp. 107–116 (1958) (month N/A).

Zanini et al., "Alternative synthesis and reflectivity spectrum of stage 1 lithium–graphite intercalation compound", Laboratory for Research on the Structure of Matter, University of Pennsylvania, pp. 211–212, (1978) month N/A.

Basu et al., "Synthesis and Properties of Lithium–Graphite Intercalation Compounds", Laboratory for Research on the Structure of Matter, University of Pennsylvania, pp. 275–282, (1979) month N/A.

Murphy et al., "Materials for Advanced Batteries", Edited by D.W. Murphy, J. Brondhead and B.C.H. Steele, NATO Conference Series, Series II: Materials Science vol. 2, Plenum Press, New York and London ©1980, Proceedings of a NATO Conference on Materials for Advanced Batteries, held Sep. 9–14, 1979 in Aussois, France, pp. 145–146, 161, p. 160 (1 paragraph) (1980) month N/A.

Armand, "Intercalation Electrodes", Laboratoire d'Engergétique, Univ rsité de Grenoble, (1979), NATO Conference on Materials for Advanced Batteries Aussois, France (1979), pp. 145, 148–149, 152–153, 156–157, 160–161 (month N/A).

CAC Sequeira and A. Hooper, "Solid State Batteries", p. 183 (1985) (one paragraph) month N/A.

Mohri et al., "Rechargeable Lithium Battery Based on Pyrolitic Carbon as a Negative Electrode", Journal of Power Sources, 26, pp. 545–551 (1989) (month N/A).

Sato et al., "Electrochemical Behavior on Linear–Graphite Hybrid as a Negative Electrode Material for Lithium Secondary Battery", Denki Kagaku, vol. 57, No. 6, pp. 528, 530, 532 (1989) month N/A.

Sanyo, "New High Capacity, Long Life Rechargeable Manganese Dioxide Lithium Battery—ML 2016, ML 2430", Sanyo Rechargeable Lithium Battery, and Safety Basis on Sanyo Flat Type Lithium Secondary Battery, (37 pages total)(1989) no month.

Japan Storage Battery Co., "Japan Storage Battery Develops new Secondary Battery Using Lithium/Cobalt Oxide for Positive Electrode", Kikkan Kogyo Newspaper, (1989) (translation) month N/A.

Mitsui & Co., Ltd., "Mitsui Cartel to Acquire Vancouver-Based Moli Energy by Purchase Based on Relief Agreement with Canadian Government to Promote Development of Lithium Cell", Nihon Keizei Newspaper, (1990) (translation) (month N/A).

Sony Energy Tech., Inc., Re: "Sony Co.'s New Battery" (1990) (translation of a Japanese newspaper article) (source unknown) (month N/A).

Sony Energy Tech., Inc., "Sony Energy to Improve Charge and Discharge Cycle With Increase in Safety of Lithium Ion Storage Cell", Kikkan Kogyo Newspaper (1990) (translation) (month N/A).

Koksbang et al., "Composite Electrodes in Rechargeable Batteries", Third Rechargeable Lithium Battery Seminar, FL, pp. 2, 4, 6, 8, 10, 12, Tabe II and non–numbered page (1990) month N/A.

Nagaura, "Study of Carbonaceous Materials for an Anode of Lithium Secondary Batteries—Part I", 58th Meeting of ECS of Japan, 2F10 (Sony Research Center) pp. 1–2 (1990) month N/A.

Nagaura, "Study of Carbonaceous Materials for an Anode of Lithium Secondary Batteries—Part II", 58th Meeting to ECS of Japan, 2F11 (Sony Research Center) pp. 1–2 (1990) month N/A.

Nagaura, "Study of Carbonaceous Materials for an Anode of Lithium Secondary Batteries—Part III", 58th Meeting to ECS of Japan, 2F12 (Sony Research Center) pp. 1–2 (1990) (month N/A).

Nagaura, "Sony Energytec's New Lithium Ion Rechargeable Batteries", JEC Battery Newsletter No. 2, pp. 9–13 (1990) month N/A.

Nagaura et al., "Lithium Ion Rechargeable Battery", Progress in Batteries and Solar Cells, vol. 9, pp. 209–217 (1990) month N/A.

Fong et al., "Studies of Lithium Intercalation into Carbons Using Nonaqueous Electrochemical Cells", J. Electrochem. Soc., vol. 137, No. 7, pp. 2009–2013 (1990) month N/A.

McMillan, "An Electrochemical Study of the $LiCoO_2$ Cathode/Carbon Secondary Galvanic Cell", J. Electrochem. Soc., Abstract No. 43, pp. 68–69 (1990) month N/A.

Dudley et al., "Conductivity of Electrolytes for Rechargeable Lithium Batteries", J. Electrochem. Soc., proposed paper, pp. 1–52 (1990) month N/A.

McMillan et al., "An Electrochemical Study of the $LiCoO_2$ Cathode/Carbon Anode Secondary Galvanic Cell", J. Electrochem. Soc., pp. 1–14 (1990) month N/A.

Dahn et al., "Rechargeable LiNiO$_2$/Carbon Nonaqueous Cells", *J. Electrochem. Soc.*, Abstract No. 42, pp. 66–67 (1990) month N/A.

Nagaura, (Sony Energytec, Inc.) "Development of Lithium Secondary Battery", Battery Technical Committee Meeting of the ECS Japan, pp. 1–12 (1990) month N/A.

Dahn et al., "Suppression of Staging in Lithium Intercalated Carbon by Disorder in the Host", Physical Review Bulletin, pp. 1–41 (1990) month N/A.

Dahn et al., "Rechargeable LiNiO$_2$/Carbon Cells", 178th Meeting of the ECS, Seattle, WA, pp. 1–13, 15–18, Figs. 1–11, presentation pp. 1–34 (1990) month N/A.

Bradt, "A Critical Review of Rechargeable Lithium Battery Technology", 4th Rechargeable Lithium Battery Seminar, FL, pp. 1–16 (1991) month N/A.

Dahn, "Air–Stable Lithium Transition Metal Oxides for Advanced Battery Applications", 4th Rechargeable Lithium Battery Seminar, FL, p.1 (1991) month N/A.

Arai et al., "Synthesis and Characterization of LiNiO$_2$ and its Derivatives as Cathode Materials for Secondary Lithium Batteries", Extended Abstracts, vol. 93–1, pp. 133–134, The Electrochemical Society Spring Meeting, Honolulu, Hawaii, May 16–21, 1993.

Arai et al., "Synthesis and Characterization of LiNiO$_2$ as a Cathode Material for Secondary Lithium Batteries", *Proc–Electrochem Soc.* (1993), 92–23, Proceeding of the Symposium on New Sealed Rechargeable Batteries and Super Capacitors, 1993 pp. 452–460 month N/A.

Arai et al., Characterization and cathode performance of $Li_{1-x}Ni_{1+x}O_2$ prepared with the excess lithium method, *Solid State Ionics*, 80 (1995) pp. 261–269 month N/A.

Database search "HCAPLUS" performed on May 7, 1997 with abstracts (5 pages).

Colson, et al., Transport Properties of Intercalated Layered Cathode Materials : $Li_xMo_2O_4$, Mat. Res. Soc. Symp. Proc., vol. 210 pp. 405–410 (1991) month N/A.

Winn et al., "TiS$_2$: A Solid Solution Electrode for Sodium and Lithium", Mat. Res. Bull., vol. 11, pp. 559–566 (1976) month N/A.

Scrosati et al., "Cyclable Copper Solid–State Cell Based on Intercalation Electrodes", *J. Electrochem. Soc.*, p. 699–700 (1979) month N/A.

MODIFIED LITHIUM NICKEL OXIDE COMPOUNDS FOR ELECTROCHEMICAL CATHODES AND CELLS

This invention was made with U.S. Government support. The U.S. Government has certain rights in the invention.

FIELD OF THE INVENTION

The present invention relates to rechargeable lithium electrochemical cells, and more particularly to secondary lithium ion electrochemical cells.

BACKGROUND OF THE INVENTION

Lithium electrochemical cells are attractive because they have high energy density, but present well-known challenges respecting safety. Lithium batteries have been regulated in several countries owing to safety hazards. Despite those drawbacks the battery industry has expended significant effort researching and developing lithium batteries because of their high energy density. Table 1 lists some prior art disclosures respecting rechargeable lithium ion electrochemical cells.

TABLE 1

PRIOR ART DISCLOSURES

| Country of Disclosure | Pat. No., Publisher, or Disclosure Type | Applicant Author or Owner | Year of Disclosure |
|---|---|---|---|
| U.S.A. | 4,302,518 | Goodenough et al. | 1981 |
| U.S.A. | 4,357,215 | Goodenough et al. | 1982 |
| U.S.A. | Material Resources Bulletin | Thomas et al. | 1985 |
| Japan | 63-114056 | Toshiba Battery Co. | 1988 |
| Japan | 63-299056 | Mitsui/Sony | 1988 |
| U.S.A. | Journal of Power Sources | Kanno et al. | 1989 |
| Japan | 2-56871 | Mitsui/Sony | 1990 |
| U.S.A. | Presentation | Nagaura | 1990 |
| Japan | 2-68859 | Toshiba Battery | 1990 |
| Japan | 2-68868 | Toshiba Battery | 1990 |
| PCT | 90/13924 | Fong et al. | 1990 |
| U.S.A. | 4,980,080 | LeCerf et al. | 1990 |
| U.S.A. | Solid State Ionics | Dahn et al. | 1990 |
| U.S.A. | Solid State Ionics | Ebner et al. | 1994 |

In U.S. Pat. No. 4,302,518 Goodenough et al. disclose a cathode material represented by the formula $A_xM_yO_2$, where A=lithium, sodium or potassium, M=a transition metal, x is less than 1 and y approximates 1. The cathode material is made using a mixture of $LiOH \cdot H_2O$ and Ni powder heated under an oxygen atmosphere at about 750° C. for twelve or more hours.

In U.S. Pat. No. 4,357,215 Goodenough et al. disclose the same cathode material and method of making same described in the foregoing '518 patent.

In an article published in the Material Resources Bulletin entitled "Syntheses & Structural Characterization of Normal Spinel $Li[Ni_2]O_4$," Thomas et al. propose a structure collapse theory, where when "x" becomes less than about 0.50 layered $LiMO_2$ becomes $Li[M_2]O_4$, and the crystalline structure assumes a cubic spinel structure.

Japanese Patent Application No. 63-299056 discloses a cathode material represented by the formula $Li_yNi_xCo_{1-x}O_2$, where $0 \leq x \leq 0.75$, and $y \leq 1.0$. Some cobalt in the crystalline structure of the cathode material is described as being replaced with larger nickel ions, thereby distorting the crystalline structure and permitting easier intercalation and deintercalation of lithium ions. A decrease in charge capacity is disclosed for x>0.75.

Unexamined Japanese Patent Publication No. 2-56871 discloses $LiCoO_2$ and $LiCo_xNi_yO_2$ cathode materials.

In an article entitled "Electrode Materials for Lithium Ion Rechargeable Batteries" Nagaura discloses the short life characteristics of lithium ion batteries having metallic lithium anodes. To solve this problem Naguara proposes an $Li_xMO_2$ cathode formulation, where M=cobalt, nickel, or manganese, and anode formulations comprising carbon or LiAl.

Unexamined Japanese Patent Publication No. 2-68859 discloses lithium ion cell having a carbonaceous anode material derived from cellulose, where the carbon is coated with lithium or lithium alloy or another metal capable of being alloyed with lithium such as aluminum.

Unexamined Japanese Patent Publication No. 2-68868 discloses an anode material for a lithium ion cell, where carbon is mixed with a lithium alloying material represented by the formula $Li_xM$, where $0 \leq x \leq 9$, the alloying material being limited to Al, Pb, Sn, Bi, In, Ga, or Cd.

In PCT International Publication No. WO 90/13924, Fong et al. disclose a carbonaceous anode for a lithium ion cell, where the carbon comprises two components, the first component being less graphitized than the second component.

In U.S. Pat. No. 4,980,080, LeCerf et al. disclose a two-step process for preparing a lithium ion cathode material represented by the formula $Li_yNi_{2-y}O_2$ or $LiNi_{1-x}Co_xO_2$, where $0.09 \leq x \leq 0.50$ and $0.085 \leq y < 1.22$.

In an article entitled "Structure, Electrochemistry of New $Li_2NiO_2$ Phase with $Ni(OH)_2$ Structure," Dahn et al. disclose a cathode material represented by the formula $Li_{1+x}NiO_2$, where when x>1 layers of lithium alternate with layers of nickel interspersed with lithium, and when x>2 an entirely different crystalline structure results.

In an article entitled "The $LiNiO_2$/carbon lithium-ion battery," Ebner et al. disclose a secondary lithium battery having an intercalation electrode.

Primary lithium electrochemical cells are commercially available and have achieved some commercial success, due at least in part to increasing safety in use. Secondary rechargeable lithium electrochemical cells, on the other hand, have achieved less success in the commercial marketplace, due in part to persistent safety problems, and even a number of product recalls. Some manufacturers have ceased production of rechargeable lithium electrochemical cells because of safety concerns. Additionally, early rechargeable lithium cells suffered from a low number of available discharge-charge cycles. Charge-discharge cycles in early lithium batteries were not entirely reversible, leading to short cycle life.

In early lithium secondary cells lithium was incorporated as lithium metal in the anode. Among the disadvantages of such cells were safety concerns associated with the presence of lithium metal and the low number of recharge cycles. Safety concerns arose respecting undesired side reactions occurring between the lithium and other chemicals in the cell such as chemicals contained in the electrolyte. Under abusive operating conditions sufficient heat could be generated to raise the reaction rates to hazardous levels, leading to cell venting and fires, or even user injury.

In respect of the number of charge-discharge cycles, lithium anodes often developed dendrites that increased in surface area with each successive cycle. Dendrites eventually interfered with cell performance characteristics, leading to early cell failure due to internal shorting and a subsequent inability to charge.

Later developments focused on incorporating lithium into the cathode material as part of its crystalline structure, where at least part of the lithium could be removed from the cathode by deintercalation of lithium ions from the cathode crystal structure. One such cathode material is $Li_xM_yO_z$. "Li" is a lithium ion, "M" is a transition metal and "O" is oxygen. Typically, "x" and "y" are about 1, and "z" is about 2 prior to deintercalation of the lithium from the cathode and corresponding intercalation of lithium into the anode. One such well known compound is $LiNiO_2$.

A typical anode material in lithium ion secondary cells may be described as a crystalline, quasi-crystalline or partially crystalline material such as carbon. The carbon may receive lithium ions in its structure by intercalation, preferably without substantial rearrangement of its structure, and may subsequently release lithium ions back to the cathode.

During the processes of intercalation and deintercalation, lithium ions rock back and forth between the cathode and anode during successive charge-discharge cycles. In a complete charge-discharge cycle, lithium ions move from the cathode to the anode as the cell is being charged, and move from the anode to the cathode as the cell is being discharged.

For a lithium intercalation cell to provide a large number of discharge-charge cycles (e.g., 500 or more cycles), the discharge portion of the cycle must be a substantially complete reversal of the preceding charge cycle, and the charge portion of the cycle must be a substantially complete reversal of the preceding discharge cycle. To the extent a charge or discharge portion of the cycle is less than completely reversible the capacity of the cell is reduced.

In most lithium ion cells, the lithium-containing cathode material is a crystalline solid having a particular crystalline structure associated therewith, but may also have a partially crystalline or partially amorphous structure. Lithium ions occupy a portion of the volume of the electrode and may contribute at least partially to the structural integrity of the crystalline structure.

As the degree of deintercalation in a cathode comprising $LiMO_2$ increases in lithium ion cells, lithium ions contribute increasingly less to the structural integrity of the crystalline structure. At some point in the deintercalation process, "x" (the stoichiometric proportion of lithium in the chemical composition of the cathode material) becomes so small that remaining lithium ions become incapable of continuing to support all or most portions of the original $\alpha$-$NaCrO_2$ crystalline structure. As a result, substantial portions of the original $\alpha$-$NaCrO_2$ crystalline structure change phase from a material represented by the formula $Li_xM_yO_2$ to a material represented by the formula $M_yO_z$ and having a phase corresponding generally to a second hexagonal phase, a third hexagonal phase, a monoclinic phase, or some combination of two or more of the foregoing phases, including an original hexagonal phase. In nearly all cases, those portions of a material having a phase corresponding to an $M_yO_z$ crystalline structure cannot change phase back to an $\alpha$-$NaCrO_2$ crystalline structure. Thus, a change in phase is often irreversible. It is in direct proportion to the extent that portions of a material change phase from an original $\alpha$-$NaCrO_2$ crystalline structure to an $M_yO_z$ crystalline structure that the change the capacity of a lithium ion cell is reduced. Known cathode materials represented by the formula $Li_xM_yO_z$ retain a reversible structure as "x" is reduced by deintercalation to values nearing 0.50. As "x" is reduced to 0.50 and below, however, at least portions of the crystalline structures of conventional cathode materials change irreversibly from $Li_xM_yO_z$ to $M_yO_z$.

It is therefore an object of the present invention to provide a cathode material for a lithium intercalation cell having a crystalline matrix, where the material has a greater proportion of lithium ions that may be deintercalated from the cathode with the $Li_xMyO_z$ crystalline structure not changing phase irreversibly.

It is another object of the present invention to provide a cathode material for a lithium intercalation cell having a crystalline matrix capable of releasing an increased amount of "x" from its crystalline structure without substantially rearranging or irreversibly changing the $\alpha$-$NaCrO_2$ crystalline structure thereof.

It is still another object of the present invention to improve charge capacity retention of the cathodes of lithium intercalation cells.

It is yet another object of the present invention to prevent overcharging of lithium intercalation cells.

Still other objects of the present invention are directed to providing a novel electrochemical cell having the above desired compositions of matter and electrodes, and to providing methods of making corresponding compositions of matter, electrodes, and cells, and to using the corresponding cells.

SUMMARY OF THE INVENTION

The present invention relates to rechargeable lithium electrochemical cells, and more particularly to secondary lithium ion cells. Nickel is employed as a component "M" in an active cathode material represented by the formula $Li_xM_yO_z$, where "x" and "y" are generally about 1, and "z" is generally about 2. In the present invention "$M_y$" is divided into two components, a first major component of nickel, corresponding to at least 70% of "$M_y$," and a second minor component comprising at least one of a non-transition metal selected from the group consisting of aluminum, gallium, tin, and zinc, and in some embodiments at least one transition metal selected from the group consisting of scandium and the Period 5 metals having atomic numbers between 39 and 42. A two-stage reaction process for making the compounds of the active cathode materials of the present invention is described.

Some objects of the present invention are attained in a first set of embodiments corresponding to a composition of matter comprising a compound represented by the formula $Li_xR_yNi_{1-y}O_z$, where "R" is at least one non-transition metal selected from the group consisting of aluminum, gallium, tin, and zinc, and "y" ranges between about 0.02 and about 0.30, preferably, about 0.05 and about 0.15, and "x" is initially between about 0.95 and about 1.05. In preferred embodiments of the present invention "z" is about 2. In the compound or composition of matter of the present invention, the crystalline structure typically corresponds to the $\alpha$-$NaCrO_2$ structure. When the compound is used as a cathode material in a lithium intercalation cell, lithium ions may be removed from the material to reduce "x" below 0.50 while retaining the ability to reversibly change the crystalline structure back to the $\alpha$-$NaCrO_2$ structure during charging.

In some embodiments of the present invention, a first component of "R" in the compound contains at least one of aluminum, gallium, tin, and zinc. The first component is present in amounts ranging between about 5 percent and about 95 percent by weight, or about 30 percent to about 70 percent by weight of the compound. A second component of "R" in the compound may contain at least one of scandium and a Period 5 transition metal having an atomic number between 39 and 42. The second component may be present in amounts ranging between about 95 percent to about 5 percent by weight, or about 70 percent to about 30 percent by weight of the compound. In preferred embodiments of the present invention, the composition of matter or cathode material comprises particles having maximum diameters not exceeding 150 microns.

A second set of embodiments of the present invention corresponds to a composition of matter comprising a compound represented by the formula $Li_xR_yNi_{1-y}O_z$, where "R" is at least one transition metal such as scandium or a Period 5 transition metal having an atomic number between 39 and 42, and "y" is between about 0.02 and about 0.30, or even more preferably between about 0.05 and about 0.15. In those embodiments, "z" is about 2 and "x" preferably ranges initially between about 0.95 and about 1.05. The crystal structure typically corresponds to an $\alpha$-$NaCrO_2$ structure. Lithium ions may be removed from the crystalline structure of the compound to reduce "x" below 0.50, or even below 0.40, while retaining the ability to reversibly change the crystalline structure back to the $\alpha$-$NaCrO_2$ structure during charging.

A third set of embodiments of the present invention corresponds to an electrode for an electrochemical cell comprising an electrochemically active material comprising a compound represented by the formula $Li_xR_yNi_{1-y}O_z$, where "R" is at least one non-transition metal selected from the group consisting of aluminum, gallium, tin, and zinc, and "y" is between about 0.02 and about 0.3.

A fourth set of embodiments of the present invention corresponds to an electrode for an electrochemical cell comprising an electrochemically active material comprising a compound represented by the formula $Li_xR_yNi_{1-y}O_z$, where "R" is at least one of scandium and a Period 5 transition metal having an atomic number between 39 and 42, and "y" is between about 0.02 and about 0.3.

Some objects of the present invention are attained in a fifth set of embodiments corresponding to an electrochemical cell comprising a negative electrode, an electrolyte and a positive electrode, the positive electrode comprising a compound represented by the formula $Li_xR_yNi_{1-y}O_z$, where "R" is at least one non-transition metal selected from the group consisting of aluminum, gallium, tin, and zinc, and "y" is between about 0.02 and about 0.3. In the fifth set of embodiments, "R" includes one or more of aluminum, gallium, tin and zinc as a first component, and scandium or a Period 5 transition metal having an atomic number between 39 and 42 as a second component. The first component is about 5 percent to about 95 percent by weight, or 30 percent to about 70 percent by weight, of "R." The second component is about 95 percent to about 5 percent by weight, or about 70 percent to about 30 percent by weight, of "R."

In electrochemical cells of the present invention, the electrolyte most preferably comprises a solute selected from the group consisting of $LiPF_6$ and $LiN(CF_3SO_2)_2$ and a solvent selected from the group consisting of compositions comprising at least one of (i) a combination of propylene carbonate and dimethoxyethane, and (ii) a combination of ethylene carbonate and methylacetate. Other solutes suitable for use in the present invention include, but are not limited to, $LiPF_6$, $LiAsF_6$, $LiBF_4$, $LiN(CF_3SO_2)_2$, $LiCF_3SO_2$ and $LiC(CF_3SO_2)_3$. Other solvents suitable for use in the present invention include, but are not limited to, PC (propylene carbonate), EC (ethylene carbonate), $\gamma$-BL (gamma butyrolactone), DME (dimethoxyethane), DEC (diethylcarbonate), DMC (dimethylcarbonate), MA (methylacetate) and MF (methylformate).

Other objects of the present invention are attained in a sixth set of embodiments corresponding to an electrochemical cell comprising a negative electrode, an electrolyte and a positive electrode, the positive electrode comprising a compound represented by the formula $Li_xR_yNi_{1-y}O_z$, where "R" is at least one transition metal selected from the group consisting of scandium or a Period 5 transition metal having an atomic number between 39 and 42, and "y" is between about 0.02 and about 0.3.

Other objects of the present invention are attained in a seventh set of embodiments corresponding to a method of making a compound represented by the formula $Li_xR_yNi_{1-y}O_z$, where "R" is at least one metal selected from the group consisting of aluminum, gallium, tin, zinc, scandium, and a Period 5 transition metal having an atomic number ranging between 39 and 42, and "y" is between about 0.02 and about 0.30. The method comprises the steps of mixing together stoichiometric amounts, as ingredients, of hydroxides of lithium, nickel, and the "R" metal or metals according to stoichiometric amounts specified by "x," "y" and "z" to make a mixture thereof; heating the mixture in a furnace provided with an atmosphere containing oxygen to a reaction temperature of at least about 600 degrees C., preferably to at least about 625 degrees C., and most preferably to about 650 degrees C.; and holding the mixture at the elevated reaction temperature in the atmosphere containing oxygen for at least 10 hours, preferably for at least 13 hours, and most preferably for at least about 15 hours, for reaction of the ingredients of the mixture.

After the step of holding the mixture at the reaction temperature for the prescribed period of time, the method preferably includes the further steps of cooling the mixture; processing the mixture in a size reducing apparatus (e.g., a ball mill) to mix the ingredients thereof and reduce particle size; heating the mixture a second time in an atmosphere containing oxygen to an elevated reaction temperature of at least about 600 degrees C., preferably to at least about 625 degrees C., and most preferably to about 650 degrees C.; and holding the mixture at the reaction temperature in an atmosphere containing oxygen for at least 2 hours, preferably for at least about 3.5 hours, and most preferably for at least about 5 hours, for further reaction of the ingredients of the mixture.

Prior to any heating of the mixture the method preferably includes processing the mixture in a size reducing apparatus to make an intimate mixture of the ingredients thereof and to reduce the size of particles in the mixture. After cooling the mixture after the first heating the mixture is then processed in a size reducing apparatus a second time to further mix the ingredients and further reduce particle size. Preferably, the method of making the compound includes selecting "y" to be between about 0.05 and about 0.15. The method preferably includes sizing the reaction product comprising the compound such that particles retained in the compound have diameters not exceeding 150 microns. The method preferably includes passing oxygen through water such that the oxygen becomes humidified, and subsequently introducing the humidified oxygen into the furnace to provide an atmosphere containing oxygen.

Still other objects of the present invention are attained in an eighth set of embodiments corresponding to a method of making an electrode for an electrochemical cell, the electrode comprising a compound represented by the formula $Li_xR_yNi_{1-y}O_z$.

Still other objects of the present invention are attained in a ninth set of embodiments corresponding to a method of making an electrochemically active cell comprising a negative electrode, an electrolyte, and a positive electrode comprising a compound of the present invention represented by the formula $Li_xR_yNi_{1-y}O_z$.

Still further objects of the present invention are attained in a tenth set of embodiments of the invention corresponding to a method of using an electrochemical cell, where the cell of the present invention is discharged or charged.

BRIEF DESCRIPTION OF THE DRAWINGS

The accompanying drawings describe details of the invention, where.

DETAILED DESCRIPTION OF THE PREFERRED EMBODIMENTS

As used in the specification and claims hereof, the term "intercalation" means a process where lithium ions are received by a crystalline, quasi-crystalline, or partially crystalline electrode material such as carbon or $LiNiO_2$. The term "intercalation" may also refer to a process of a lithium ion being inserted into a vacant site in an existing crystalline, quasi-crystalline or partially crystalline structure in an electrode.

As used in the specification and claims hereof, the term "deintercalation" means a process where lithium ions are released from the structure of an electrode material and migrate to the opposing electrode of opposite polarity. The term "intercalation" may also refer to a process of a lithium ion being removed or migrating away from an electrode.

Figure 1:
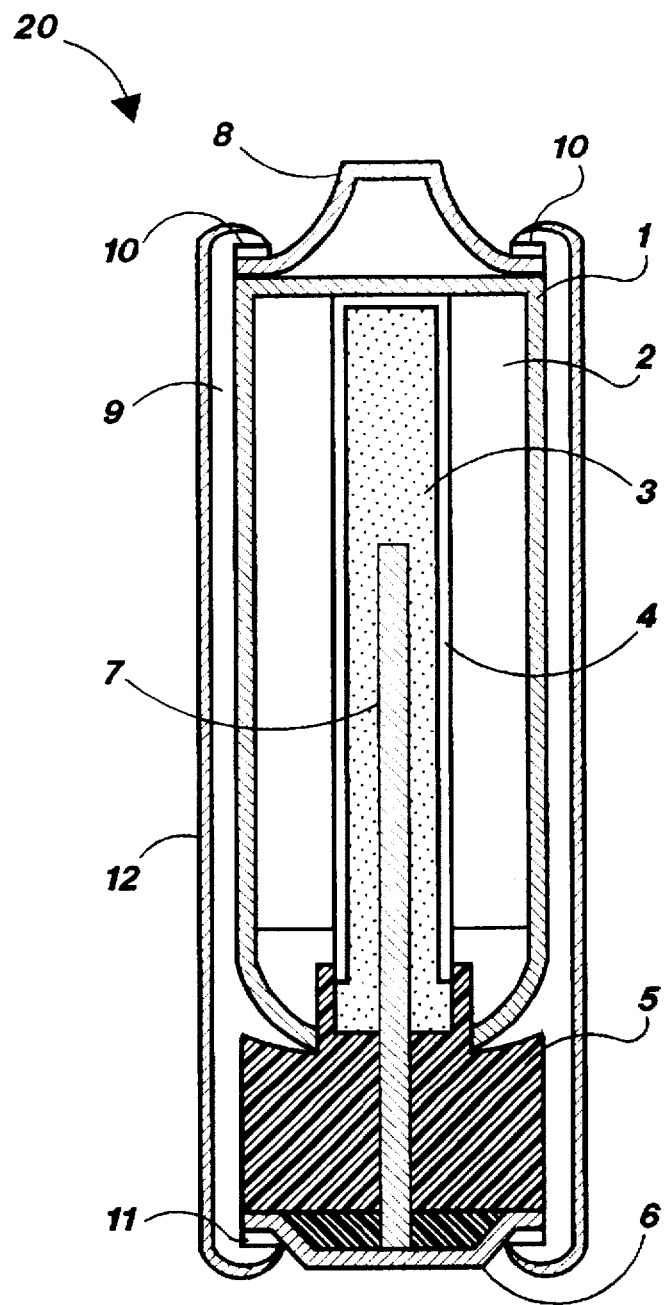
FIG. 1 shows a cross-sectional view of a round cell of the present invention.

A round cell embodiment of the present invention is shown in FIG. 1. The physical arrangement of the elements of round cell 20 is generally conventional, where round cell 20 comprises cathode can 1, cathode body 2, anode body 3, separator 4, opening sealant 5, anode bottom plate 6, anode collector 7, cap 8, tube or separator 9, insulating rings 10 and 11, exterior can 12, and an electrolyte composition, not shown, dispersed throughout cathode 2, anode 3, and separator 4. While the electrochemical operation of any cell depends on a complex series of interactions among the several elements, the present invention is directed primarily to cathode 2 with secondarily to anode 3 and the composition of the electrolyte.

Figure 2:
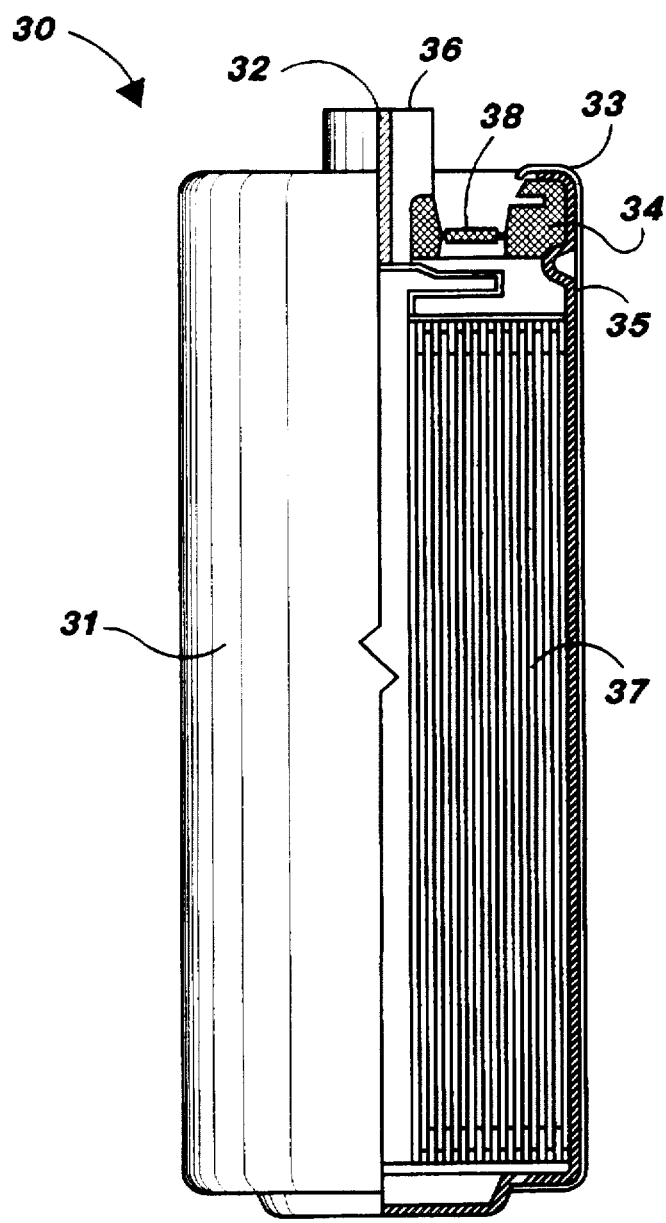
FIG. 2 shows a partial cross-sectional view of a spirally wound cell of the present invention.

A spirally wound embodiment of the present invention is shown in FIG. 2. The physical arrangement of the elements of spirally wound cell 30 is generally conventional, where spirally wound cell 30 comprises nickel-plated steel can 31, stainless steel positive pin 32, sealing crimp 33, polypropylene header or cell top 34, anode tab 35, cathode tab 36, spirally wound anode and cathode sheets separated by two contiguous microporous polypropylene separator sheets 37, and safety vent 38. An electrolyte composition, not shown, is dispersed throughout spirally wound anode and cathode 37. While the electrochemical operation of any cell depends on a complex series of interactions among the several elements, the present invention is directed primarily to spirally wound anode and cathode 37 and the composition of the electrolyte.

Cells of the present invention may assume various shapes and configurations not shown in FIGS. 1 and 2 including, but not limited to, other types of wound cells, coin cells and prismatic cells.

In general, the electrochemically active material the cathode of the present invention corresponds to a compound represented by the formula $Li_xR_yNi_{1-y}O_z$, where the subscript "x" for lithium is typically about 1. The exact value of "x" depends on the stoichiometric amounts of the reactants, the reaction conditions and the processes used to form the compound. A general range for "x" is between about 0.85 and about 1.10, while a preferred range for "x" is between about 0.95 and about 1.00.

The subscript "z" for the oxygen is typically about 2. The exact value or fraction of "z" depends on reactant quantities, reaction conditions and the processes used to form the compound of the present invention.

The present invention includes within its scope replacing part of the nickel in a composition of matter, compound or electrode represented by the formula $LiNiO_2$ with a replacement metal ion less susceptible to participating in the transfer of lithium ions through donating or receiving electrons. The replacement metal ion either does not release its electrons at all during lithium ion transfer or releases electrons less readily than nickel. The compound of the present invention generally has an $\alpha$-$NaCrO_2$ crystalline structure. Replacement metal ions finding application in the present invention are less susceptible to a dynamic change of valence state during the discharge-charge cycle. The reduced susceptibility to change of valence state is accompanied by and corresponds to a reduced susceptibility to the crystalline structure being rearranged during cycling.

The fraction of nickel that may be replaced in the compound of the present invention is limited, however, because replacing too much nickel causes some of the beneficial properties provided by nickel to be reduced to unacceptable levels. In preferred embodiments of the present invention, a suitable replacement metal ion does not donate or receive electrons, or donates or receives few electrons, during the lithium ion transfer process. By replacing a limited portion of nickel with an "R" metal or combination of metals, an appropriate balance is achieved between the benefits inuring from the use of nickel and the benefits inuring from the use of "R" metals.

To the extent "R" ions do not participate electrically in the transfer of lithium ions in the cell, they do not change valence state during the discharge-charge cycle, and thus do not contribute to the tendency of the active cathode material to rearrange its crystal structure as the charging process nears completion. The presence of "R" ions contributes to the stability of the crystalline structure of the cathode material, and permits a greater fraction of lithium ions to be deintercalated from the matrix of the active cathode material when the cell is being cycled without a rearrangement of the cathode crystalline structure occurring. "R" ions permit lithium ions to be deintercalated from the active cathode material until "x" is 0.4 or less without the electrolyte being oxidized, and without irreversible change occurring to the crystalline structure.

As implied by the "1-y" subscript for the transition metal nickel the sum of the subscript "y" for "R" and the subscript "1-y" for "Ni" is generally equal to one. "Y" is generally defined as greater than 0.05, and up to about 0.30. Typically "y" should be at least about 0.02 for "R" to have a noticeable affect on the properties of the compound. Thus, about 0.02 is a preferred lower limit for "y."

To the extent "R" replaces nickel, some desirable properties of nickel are lost. Accordingly, complete replacement of nickel is not contemplated in the present invention. Rather, the present invention is directed to limited replacement of only a minor fraction of the nickel with a suitable metal. A desirable balance of properties and respective benefits is obtained when no more than about 15% of the nickel is replaced. Thus, a preferred upper limit for "y" is about 0.15.

In view of the above considerations, the value of the nickel subscript "1-y" generally ranges from about 0.70 to less than about 1.00, and preferably ranges between about 0.85 and about 0.95. Thus, "R" is a substitute for part of the nickel in the well-known cathode material formula $Li_xNiO_2$ having the $\alpha$-$NaCrO_2$ crystal structure.

The exact metal to be used as "R" and the amount of such metal to be used depend on the desired properties and applications of the cathode material. A first set of embodiments of cathode materials and corresponding cells is represented by a general performance cell capable of handling a variety of loads and currents, wherein "R" is selected from the group of non-transition metals aluminum, gallium, tin, and zinc, thereby replacing the corresponding fraction of the transition metal nickel with one of the above recited non-transition metals. It is also contemplated that "R" may comprise a combination of more than one of the above recited non-transition metals.

A second set of embodiments of cathode materials and corresponding electrochemical cells is represented by a cell having large current delivery capabilities during discharge, but that is somewhat less susceptible to overheating than a conventional $LiNiO_2$ cell. In the first set of embodiments "R" is a transition metal selected from the group consisting of scandium and Period 5 transition metals having atomic numbers between 39 and 42 (e.g., yttrium, zirconium, niobium and molybdenum). Those transition metals do not appear in close proximity to nickel on the Periodic Table, and thus have substantially different chemical, atomic and structural characteristics in respect thereof. Accordingly, the physical, chemical and electrical properties of compounds having those metals differ substantially from those containing nickel, or other metals in close proximity to nickel on the Periodic Table. In the present invention, "R" may also comprise a combination of more than one of the above recited transition metals.

A third set of embodiments of cathode materials and corresponding electrochemical cells has a combination of characteristics of the first and second sets of embodiments, wherein "R" is a combination of (i) one or more of the non-transition metals in the first set and (ii) one or more of the transition metals in the second set. Such cathode compounds generally have properties intermediate between those corresponding to the first and second sets of embodiments. Generally, the transition metal is between about 5 percent and about 95 percent of "R" and the non-transition metal is between about 95 percent and about 5 percent of "R." To attain more pronounced effects from the transition metal and the non-transition metal, the transition metal should be between about 30 percent and about 70 percent of "R" and the non-transition metal should be between about 70 percent and about 30 percent of "R."

A method of making a cell of the present invention usually begins with making the active cathode material by reacting appropriate ingredients under appropriate conditions to make the compound $Li_xR_yNi_{1-y}O_z$, wherein the compound has the $\alpha$-$NaCrO_2$ crystalline structure.

To maintain acceptable rates of lithium ion transfer between the anode and cathode, the particle size of the active cathode material should be no larger than 150 microns. In its preferred embodiment the compound of the present invention should comprise essentially fully reacted material once the reaction process has been completed, and most or all particles in the compound should pass through a sieve having square openings 150 microns on a side. Particles of such size exhibit good packing properties and have high surface area, thus heightening the electrochemical activity of the cathode. Accordingly, the preferred method of making the active cathode material includes appropriate steps directed to ensure that any large particles in the active cathode material are reduced in size or removed from the material.

After the active cathode material reaction product has been produced, cathode additives are typically incorporated into the reaction product. Typical cathode additives include, but are not limited to, conductor materials such as carbon black (most preferably added in amounts of up to about 10% by weight of the overall cathode material) and binders such as polyvinylidene fluoride or PVDF (typically added in amounts of up to about 5% by weight of the overall cathode material). The resulting mixture of active cathode material, binder and conductor is then formed into a cathode of appropriate size and shape. The cathode is then incorporated into an electrochemical cell such as cells 20 and 30 shown in FIGS. 1 and 2.

The anode material for the anode is selected from well-known materials capable of accepting lithium ions by intercalation and otherwise suitable for use in electrochemical cells. A typical anode body comprises one or several various forms of carbon, including graphite and other crystalline or quasi-crystalline forms or allotropes of carbon.

Most preferably the electrolyte is a solution of the solute $LiPF_6$ or $LiN(CF_3SO_2)_2$ and a solvent of at least one of (i) propylene carbonate and dimethoxyethane; (ii) ethylene carbonate and methylacetate, and (iii) a combination of (i) and (ii). A minimum requirement of the electrolyte is that the overall electrolyte composition facilitate the transfer of lithium ions between the cathode and the anode. Other solutes suitable for use in the present invention include, but are not limited to, $LiPF_6$, $LiAsF_6$, $LiBF_4$, $LiN(CF_3SO_2)_2$, $LiCF_3SO_2$ and $LiC(CF_3SO_2)_3$. Other solvents suitable for use in the present invention include, but are not limited to, PC (propylene carbonate), EC (ethylene carbonate), $\gamma$-BL (gamma buterylactone), DME (dimethoxyethane), DEC (diethoxyethane), DMC (dimethylcarbonate), MA (methylacetate) and MF (methylformate).

The method of making the active cathode material is as follows. Stoichiometric amounts of LiOH, Ni(OH)$_2$ and R(OH)$_r$ reactants or other compounds containing "R" are weighed to yield an Li/(Ni+R) ratio of 1.0 to 1.1. The reactants are first mixed in a mechanical mixer for 30 minutes to achieve a uniform mixture, and then ball-milled in a ball mill for 30 minutes to continue mixing and reduce particle size of the reactants.

Figure 3C:
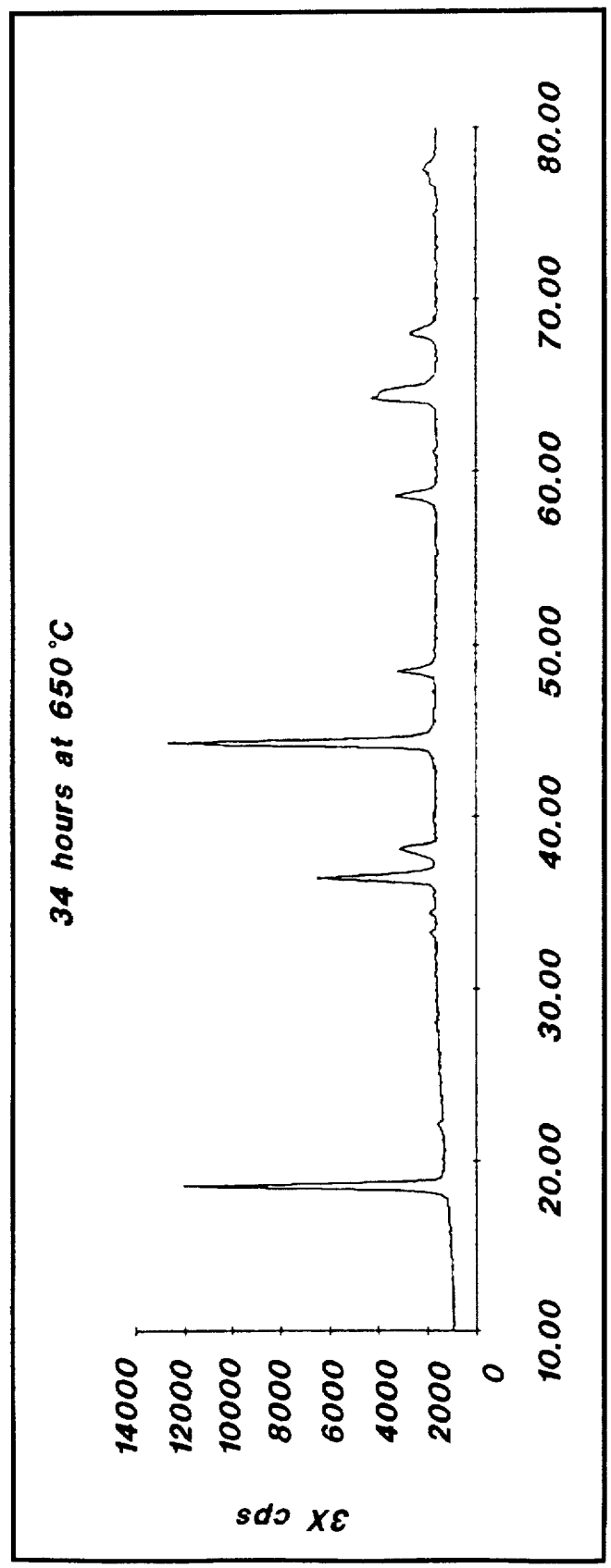
FIGS. 3A–3C show x-ray diffraction patterns of an active cathode material of the present invention made at three different stages in the development of the reaction product of the present invention.

After ball milling the balls are removed and the mixture of reactant materials is placed in nickel boats, the boats being placed in a furnace. An oxygen atmosphere is created in the furnace by bubbling oxygen through deionized water and introducing the humidified oxygen into the furnace. The furnace is heated a first time in the oxygen atmosphere to a first reaction temperature of between about 600 degrees C. and about 700 degrees C. to cause the reactants in the mixture to react. A preferred reaction temperature is at least about 625 degrees C., with a reaction temperature of about 650 degrees C. being most preferred. The furnace is held at the reaction temperature for a reaction time of at least about 10 hours to complete the first or primary reaction step. Somewhat longer reaction times may be used in some embodiments, where reaction times may be 13 to 15 hours, or even longer. FIG. 3C shows reaction times of up to 34 hours produce no detrimental affect. After the selected reaction time has elapsed, the furnace is cooled to about 400 degrees C. and the reaction materials are removed from the furnace. As used in the specification and claims hereof, the term "reaction materials" refers to the material retrieved from the furnace after the primary reaction, where the material is typically a combination of a reaction product and unreacted reactants.

The reaction materials are again placed in the ball mill and ball milled for 30 minutes. After ball milling the reaction materials are placed back in the nickel boats, the nickel boats then being returned to the furnace. The furnace is heated a second time to a second reaction temperature for a second reaction time. The second reaction temperature is also between about 600 degrees C. and about 700 degrees C., and is typically heated to the same temperature to which the furnace was heated for the first reaction time. The second reaction time is preferably shorter than the first reaction time, and is typically somewhere between about 2 hours and about 8 hours. The second reaction time may optionally be between about 3.5 hours and about 5 hours. The total of the first and second reaction times should be at least 12 hours, and may be up to 20 hours or more, depending on the specific materials being reacted, the sizes of the reactant particles, reaction temperatures, and other factors.

The relative durations of the first and second reaction times may be rearranged so that the second reaction time is longer than the first reaction time. The intermediate ball milling step provides a fresh mixing of the reaction materials between the two reaction periods, and also causes additional size reduction of the particles comprising the reaction materials. Accordingly, it is generally preferred that the first reaction time be longer than the second reaction time so that only minor amounts of reactant materials remain to be reacted or exposed to reaction conditions following further breaking up of reactant particles after the intermediate ball milling step. If the first reaction time is shorter than the second reaction time, more total reaction time and slightly higher reaction temperatures are generally required. Reaction temperatures should not exceed about 725 degrees C.

The reaction may even be carried out in a single reaction step. When only a single reaction step is used, however, the benefits of the second reaction step are not received. Accordingly, when a single reaction step is used the reaction time should be increased and the fraction of unreacted reactants at the end of the reaction step is typically higher than when two reaction steps are used.

After the reaction materials have been held at the second reaction temperature for the second reaction time, the resulting reaction product is a substantially completely reacted compound of the formula Li$_x$R$_y$Ni$_{1-y}$O$_z$ as described above, corresponding to the active cathode material. The reaction product is ball milled a third time for 30 minutes, screened through a 150 micron sieve to remove any lumps, heated to 100 degrees C. to remove any moisture, and stored dry until used.

When the cathode is made, an active cathode material made in accordance with the above described procedures is mixed with a conductor such as super S carbon and a binder such as PVDF. The resulting mixture is formed into a cathode body of appropriate size and shape for. use in an electrochemical cell. The cathode body, anode body, separator, current collectors, and electrolyte are assembled, along with other appropriate components to make the cell.

EXAMPLE A

Figure 3B:
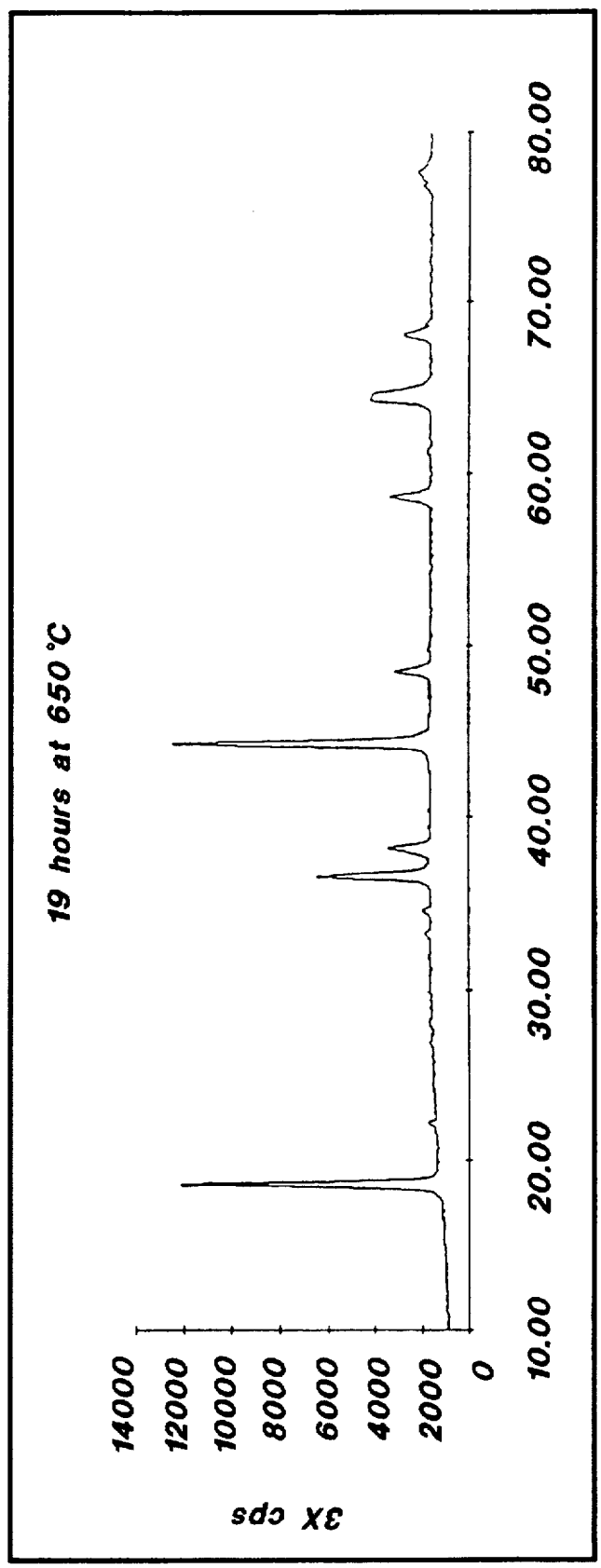
Figure 3A:
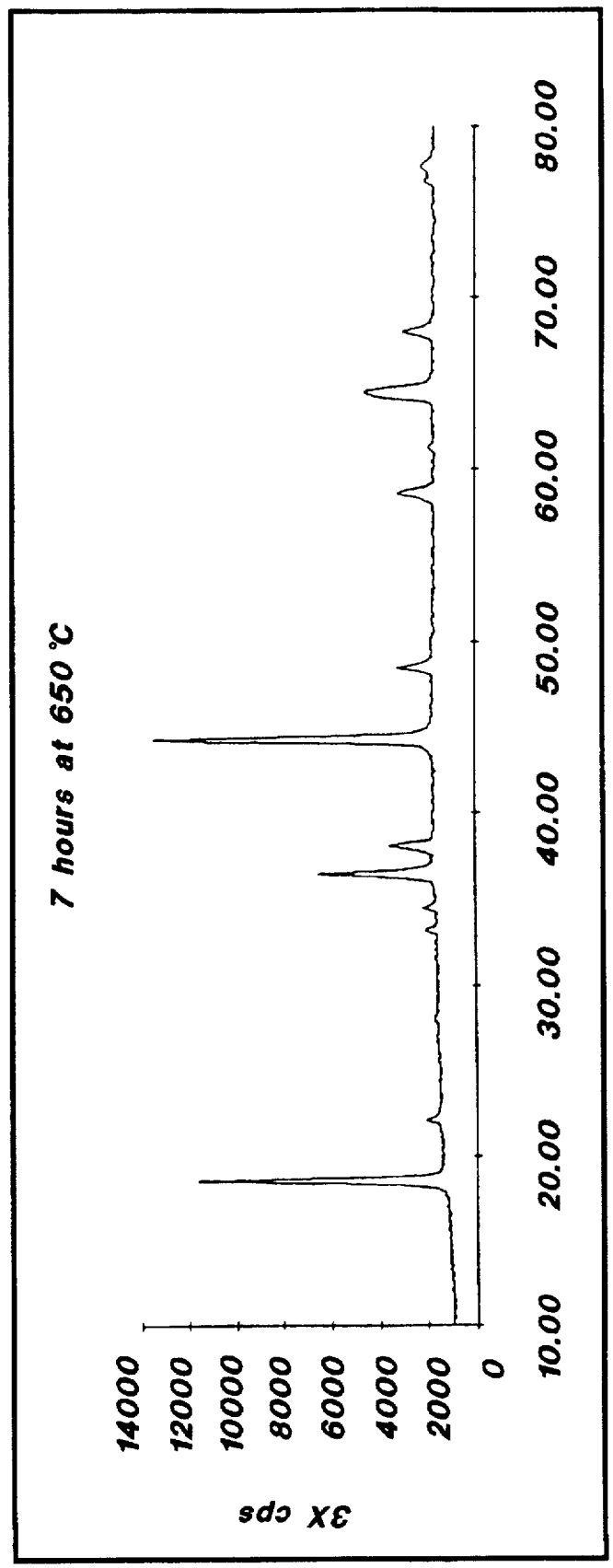

FIG. 3A shows a first X-ray diffraction curve obtained with a cathode compound and mixture of the present invention after the mixture has been heated for 7 hours at the first reaction temperature. The X-ray diffraction curve of FIG. 3A exhibits a minor peak at 21 degrees and a pair of minor peaks at about 33–34 degrees. Those peaks represent the presence of aluminum or aluminum oxides in minor amounts.

FIG. 3B shows a second X-ray diffraction curve obtained with the cathode compound and mixture of FIG. 3A after 19 hours of heating at the first reaction temperature. The X-ray diffraction curve of FIG. 2B retains small peaks at 21 degrees and 33–34 degrees. The size of those peaks is diminished substantially respecting FIG. 3A and indicates an almost complete disappearance of the aluminum as a separate mixture ingredient. This suggests that an almost complete reaction of the aluminum has occurred in the Li$_x$Al$_y$Ni$_{1-y}$O$_2$ compound and cathode mixture.

FIG. 3C shows a third X-ray diffraction curve obtained with the cathode compound and mixture of FIG. 3A after 34 hours of heating at the first reaction temperature. The minor peaks at 21 degrees and 33–34 degrees are much like those in FIG. 3B, indicating that an additional 15 hours of reaction time did not change the composition of the compound substantially and that the reaction had proceeded to its endpoint after about 19 hours of heating.

EXAMPLE B

Figure 4:
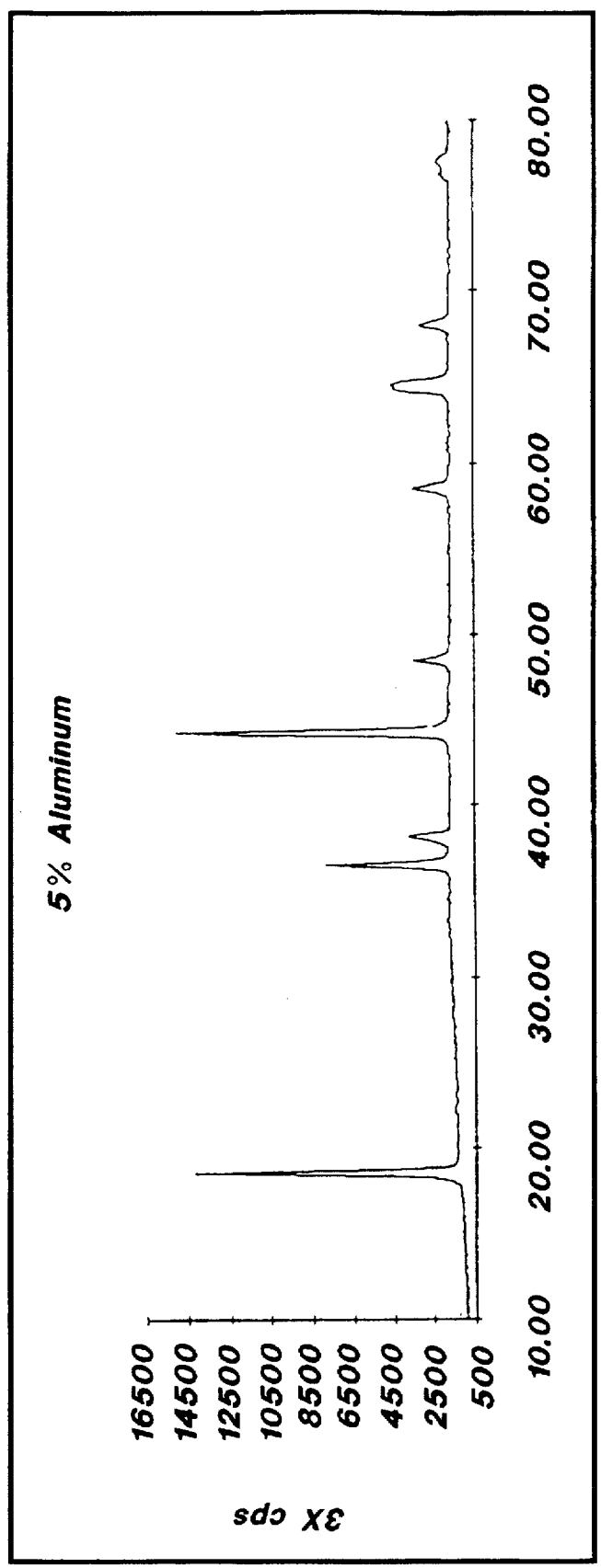
FIGS. 4, 5 and 6 show x-ray diffraction patterns of active cathode material compounds of the present invention where 5% of the nickel is replaced by aluminum, 10% of the nickel is replaced by aluminum, and 10% of the nickel is replaced by gallium, respectively.
Figure 5:
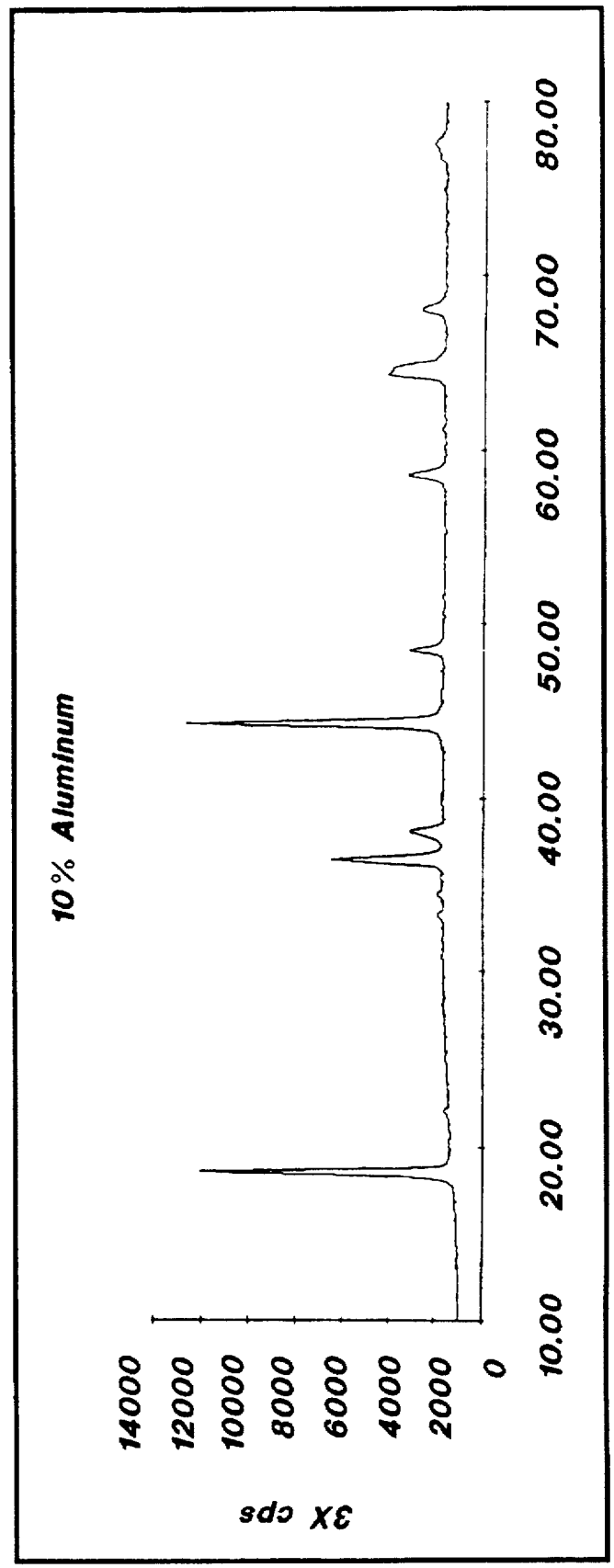
Figure 6:
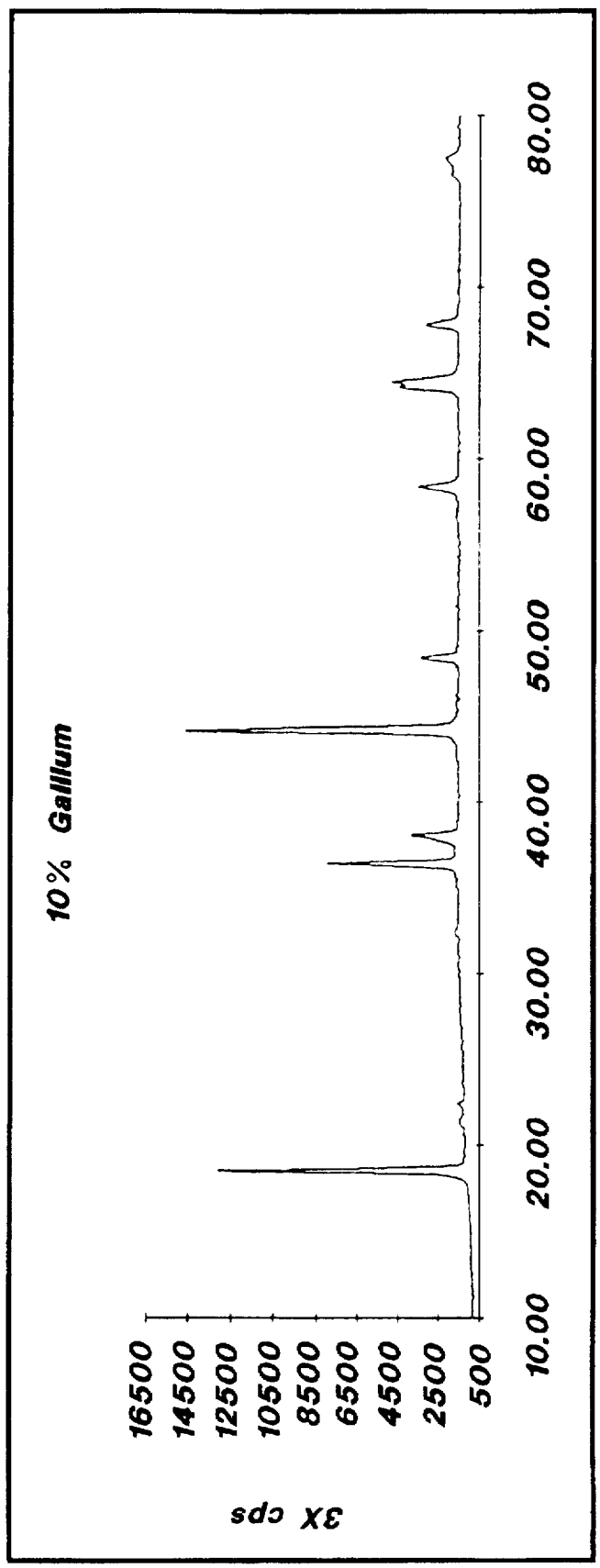
Figure 7:
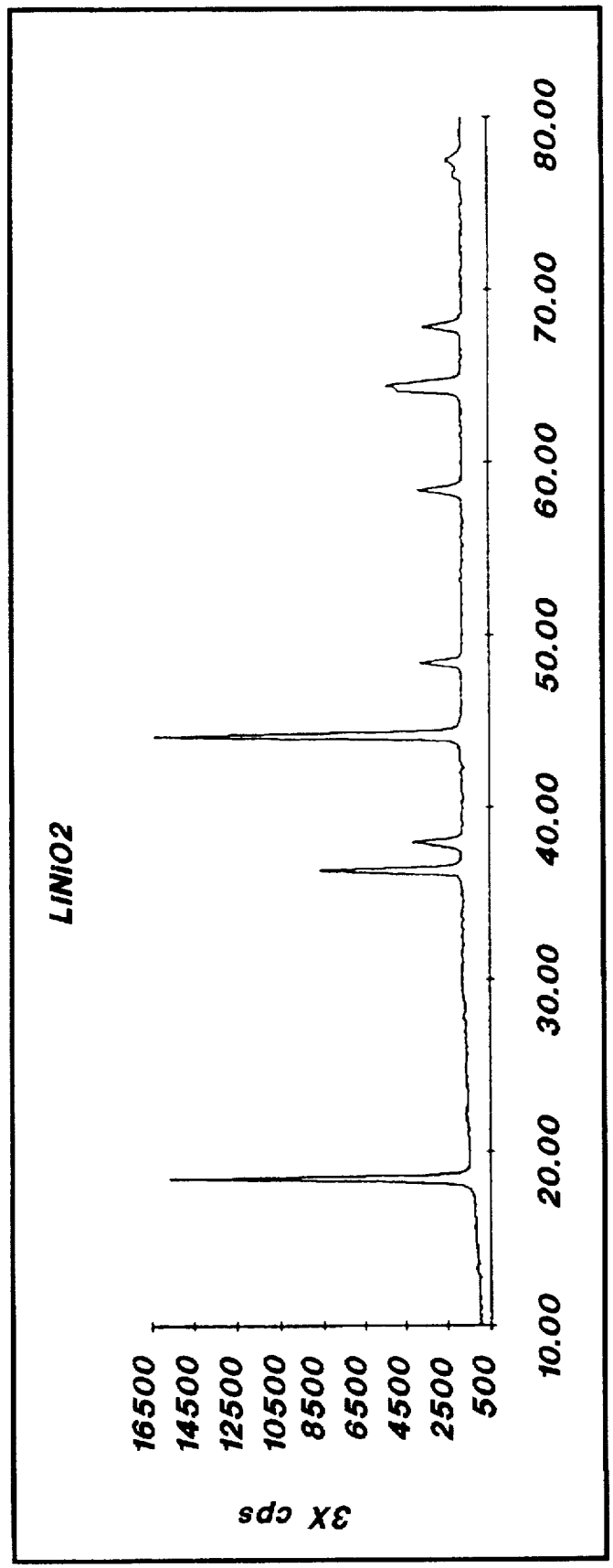
FIG. 7 shows an x-ray diffraction pattern of unmodified $LiNiO_2$.

FIGS. 4, 5 and 6 show x-ray diffraction patterns of active cathode material compounds of the present invention where 5% of the nickel is replaced by aluminum, 10% of the nickel is replaced by aluminum, and 10% of the nickel is replaced by gallium, respectively. FIG. 7 shows an x-ray diffraction pattern of a conventional, unsubstituted, unmodified lithium nickel oxide cathode material. Analysis of FIGS. 4, 5, 6 and 7 showed that the compounds of the present invention were not mere admixtures of dissimilar compounds, or mere admixtures of reacted and unreacted materials. Instead, the analysis showed that the tested compounds were single phase materials and true chemical compounds.

Table 2 below shows a comparison of lattice parameters for (a) the lithium aluminum nickel oxide compound of the present invention for which x-ray diffraction pattern results are shown in FIG. 5, and (b) generally accepted lattice parameters for a conventional $LiNiO_2$ compound having an $\alpha$-$NaCrO_2$ crystalline structure.

TABLE 2

COMPARISON OF LATTICE PARAMETERS

| Compound | a-Parameter (Angstroms) | b-Parameter (Angstroms) |
|---|---|---|
| $LiNiO_2$ | 2.875826 | 14.181317 |
| $LiAl_{0.1}Ni_{0.9}O_2$ | 2.875191 | 14.201592 |

Table 2 shows that the compound of the present invention generally retains the basic $\alpha$-$NaCrO_2$ structure but is further characterized in having a significantly different b-parameter respecting conventional prior art compounds. Table 2 confirms that the compound of the present invention is, in fact, a true chemical compound and not merely a mixture or admixture of unreacted ingredients.

EXAMPLE C

A 200 gram batch of active cathode material represented by the formula $Li_xR_yNi_{1-y}O_z$ where "R" was aluminum, "x" was about 1 and "y" was 0.05, was made as follows. Fifty-five grams of LiOH, 183 grams of $Ni(OH)_2$ and 13 grams of $Al(OH)_3$ were measured as reactants for making the active cathode material and mixed together by mechanical mixing means for 30 minutes. The reactants were placed in a ball mill having 10 cm diameter steel balls, and ball milled for 30 minutes. The mill balls were screened out of the mixture and the reactants were transferred to two nickel boats.

The boats were then placed in a furnace. Oxygen was introduced into the furnace after being bubbled through deionized water, creating an oxygen rich atmosphere in the furnace. The furnace was heated at the rate of 10 degrees C. per minute until the temperature reached 575 degrees. The furnace was then heated at 5 degrees C. per minute until the temperature in the furnace reached a reaction temperature of 650 degrees C. The reactants were held in the furnace at the reaction temperature for a first reaction time of 15 hours for the reactants to react. The furnace was then cooled to 400 degrees C., and the boats removed from the furnace.

The reaction mixture was again ball milled for 30 minutes, returned to the nickel boats and placed back in the furnace. The furnace was again heated to a second reaction temperature of 650 degrees C. using the same procedures and conditions as used during the first reaction period. The second reaction time or period was five hours. After the reaction mixture had been held at the reaction temperature for five hours the furnace was cooled. (Later analysis of the reaction mixture removed from the furnace showed that it was active cathode material reaction product represented by the formula $Li_1Al_{0.05}Ni_{0.95}O_2$.)

Next, the reaction product was ball milled for 30 minutes, and screened through a 150 micron sieve. The reaction product was mixed with 5% by weight polyvinylidene fluoride as binder, 4% by weight graphite as conductor, and 1.5% by weight carbon black. The resulting mixture was coated onto a current collector suitable for use in a standard-size AA cell. The cathode so formed was incorporated into standard-size AA cells, along with a petroleum coke anode and electrolyte comprising 1 molar $LiPF_6$ solute and a mixture of equal volumes of propylene carbonate and dimethoxyethane as solvent.

Figure 8:
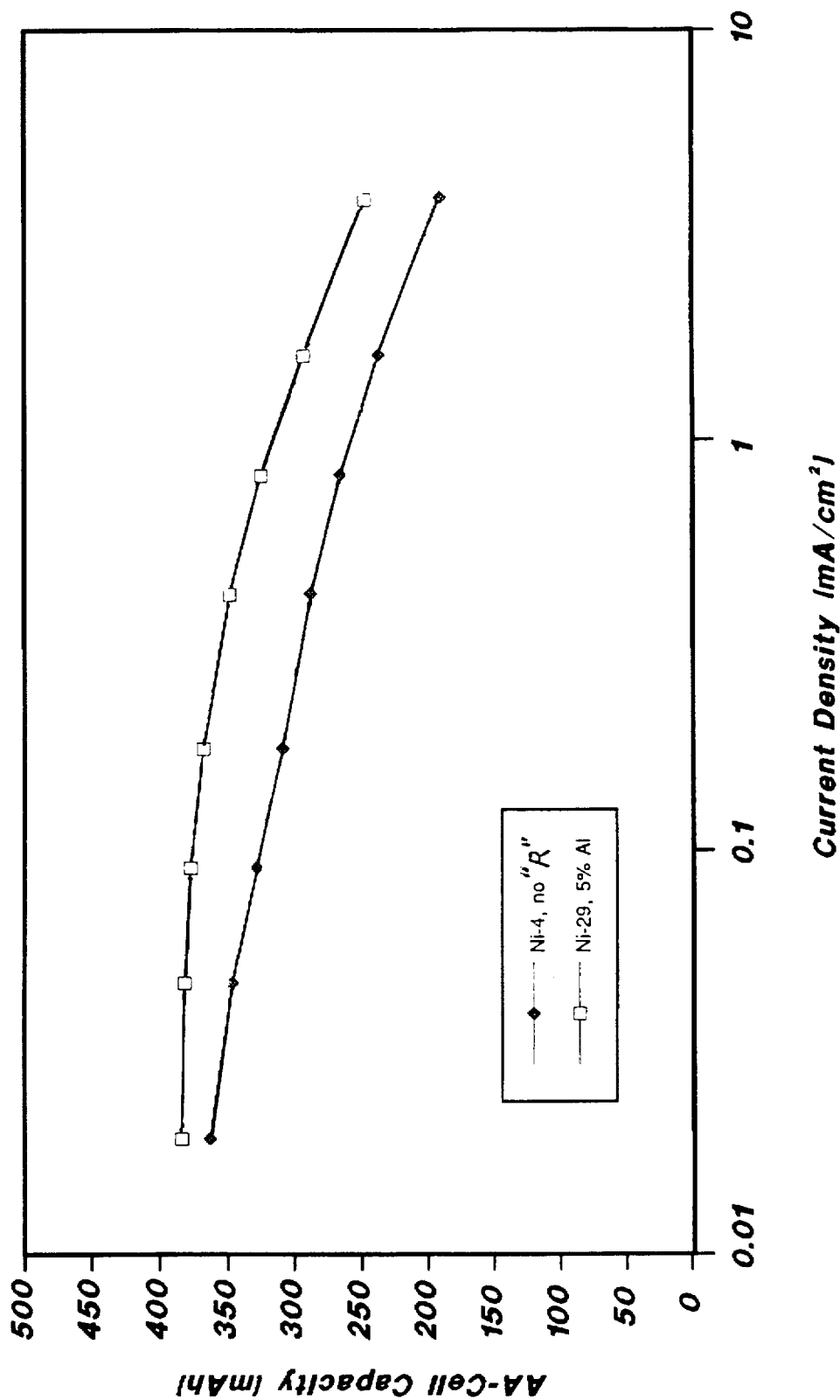
FIG. 8 is a graph showing comparative overall cell capacities as a function of current density for cathodes made with active cathode materials having and not having the "R" component of the present invention.
Figure 9:
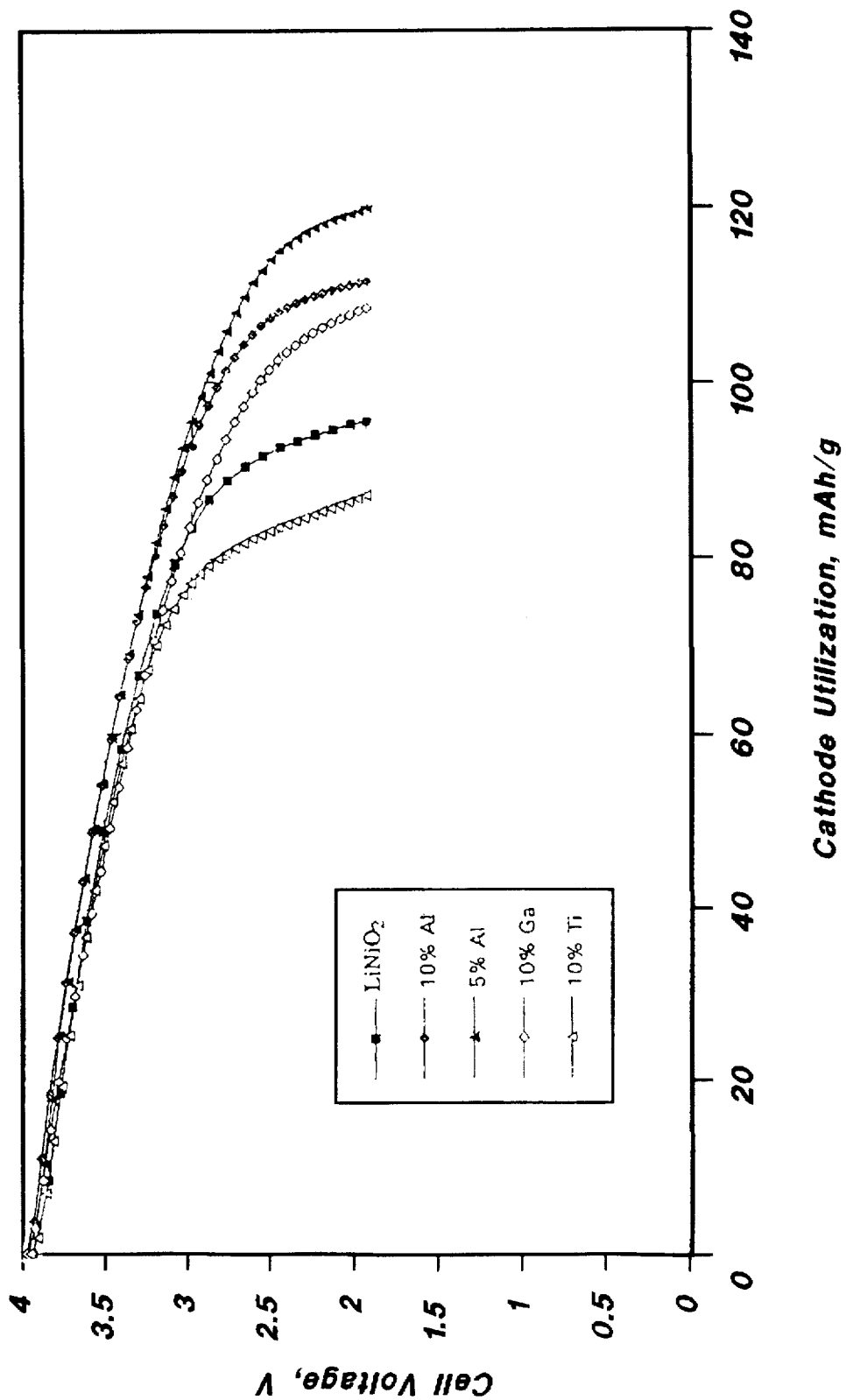
FIG. 9 is a graph showing total coulometric capacities of cells of the present invention in comparison to those of conventional prior art cells made with $LiNiO_2$ and $LiR_yNi_{1-x}O_2$.

The resulting cells were charged to four volts by intercalating lithium from the cathode into the anode until "x" was reduced to approximately 0.32. The cells so charged had the performance characteristics shown in FIG. 8, and in the graphic line labeled "5% Al" in FIG. 9. As shown in FIGS. 8 and 9, the performance characteristics of the active cathode compound modified with aluminum substantially exceeded the performance characteristics of a corresponding cell made with $LiNiO_2$ and without an aluminum additive.

FIG. 9 shows that cells of the invention, wherein part of the nickel in the cathode has been replaced as described above, have higher charge capacities than do similar cells not so modified. Cells of the present invention had charge capacities 14%–26% greater than cells containing unmodified $LiNiO_2$. While unmodified $LiNiO_2$ cells had charge capacities averaging about 95 mAh/g, the measured charge capacities of cells of the present invention were as follows: $LiGa_{0.1}Ni_{0.9}O_2$ cells: about 108 mAh/g; $LiAl_{0.1}Ni_{0.9}O_2$ cells: about 111 mAh/g; $LiAl_{0.05}Ni_{0.95}O_2$ cells: about 120 mAh/g. Cells containing $LiTi_{0.1}Ni_{0.9}O_2$ were measured as having charge capacities less than those of cells containing unmodified $LiNiO_2$ (only about 86 mAh/g).

FIG. 8 shows that cells of the present invention exhibit an overall increase in charge capacity respecting prior art conventional cells. The increase in charge capacity ranges from about 5% to about 31%, depending on current density.

Those skilled in the art will now see that certain modifications may be made to the compositions of matter, the electrodes, the electrochemical cells and methods disclosed herein without departing from the spirit of the present invention. While the invention has been described above in respect of the preferred embodiments, it will be understood that the invention is adapted to numerous rearrangements, modifications, and alterations, and that all such arrangements, modifications, and alterations are within the scope of the appended claims.

We claim:

1. A composition of matter represented by the formula $Li_xR_yNi_{1-y}O_z$, wherein "R" comprises at least one non-transition metal selected from the group consisting of aluminum, gallium, tin, and zinc, "x" is initially between about 0.95 and about 1.05, "y" is between about 0.02 and about 0.30, "z" is about 2 and the composition having a crystalline structure corresponding to an $\alpha$-$NaCrO_2$ structure.

2. A composition of matter as in claim 1, wherein the composition is characterized in having layers according to the $\alpha$-$NaCrO_2$ structure when "x" becomes less than 0.50.

3. A composition of matter as in claim 1, wherein the composition characterized in having layers according to the $\alpha$-$NaCrO_2$ structure when "x" becomes 0.40 or less.

4. A composition of matter as in claim 1, wherein "y" is between about 0.05 and about 0.15.

5. A composition of matter as in claim 1, wherein "y" is about 0.1.

6. A composition of matter as in claim 1, wherein the composition of matter comprises particles having diameters not exceeding about 150 microns.

7. A composition of matter represented by the formula $Li_xR_yNi_{1-y}O_z$ wherein "R" has a first component comprising at least one of aluminum, gallium, tin and zinc, and a second component comprising at least one of scandium and a Period 5 transition metal having an atomic number between 39 and 42, the first component being between about 5 percent and about 95 percent by weight of "R," the second component being between about 95 percent and about 5 percent by weight of "R," and "x" is initially between about 0.95 and about 1.05, "y" is between about 0.02 and about 0.30 and "z" is about 2 and the composition having a crystalline structure corresponding to α-NaCrO$_2$ structure.

8. A composition of matter as in claim 7, wherein the first component is between about 30 percent and about 70 percent by weight of "R," and the second component is between about 70 percent and about 30 percent by weight of "R."

9. A composition of matter represented by the formula Li$_x$R$_y$Ni$_{1-y}$O$_z$, wherein "R" is at least one of scandium and a Period 5 transition metal having an atomic number between 39 and 42, "x" is initially between about 0.95 and about 1.05, "y" is between about 0.02 and about 0.30, "z" is about 2, and the composition having a crystalline structure corresponding to an α-NaCrO$_2$ structure.

10. A composition of matter as in claim 9, wherein the compound is characterized in having layers according to the α-NaCrO$_2$ structure upon charging after "x" becomes less than 0.50.

11. A composition of matter as in claim 9, wherein the composition is characterized in having layers according to the α-NaCrO$_2$ structure upon charging after "x" becomes 0.40 or less.

12. A composition of matter as in claim 9, wherein "y" is between about 0.05 and about 0.15.

13. A composition of matter as in claim 9, wherein "y" is about 0.10.

14. A composition of matter as in claim 9, wherein the composition of matter comprises particles having diameters not exceeding about 150 microns.

15. An electrode for an electrochemical cell, the electrode comprising an electrochemically active material represented by the formula Li$_x$R$_y$Ni$_{1-y}$O$_z$, wherein "R" comprises at least one non-transitional metal selected from the group consisting of aluminum, gallium, tin and zinc, "x" is initially between about 0.95 and about 1.05, "y" is between about 0.02 and about 0.30, and "z" is about 2 and the material having a crystalline structure corresponding to an α-NaCrO$_2$ structure.

16. An electrode for an electrochemical cell as in claim 15, wherein the material is characterized in having layers according to the α-NaCrO$_2$ structure upon charging after "x" becomes less than 0.50.

17. An electrode for an electrochemical cell as in claim 15, wherein the material is characterized in having layers according to the α-NaCrO$_2$ structure upon charging after "x" becomes 0.40 or less.

18. An electrode for an electrochemical cell as in claim 15, wherein "y" is between about 0.05 and about 0.15.

19. An electrode for an electrochemical cell as in claim 15, wherein "y" is about 0.10.

20. An electrode for an electrochemical cell as in claim 15, wherein the material comprises particles having diameters not exceeding about 150 microns.

21. An electrode for an electrochemical cell as in claim 15, wherein the electrode further comprises up to about 10% by weight of a conductor material and up to about 5% by weight of a binder material.

22. An electrode for an electrochemical cell as in claim 15, wherein "R" has a first component comprising at least one of aluminum, gallium, tin and zinc, and a second component comprising at least one of scandium and a Period 5 transition metal having an atomic number between 39 and 42, the first component being between about 5 percent and about 95 percent by weight of "R," the second component being between about 95 percent and about 5 percent by weight of "R."

23. An electrode for an electrochemical cell as in claim 22, wherein the first component is between about 30 percent and about 70 percent by weight of "R," and the second component is between about 70 percent and 30 percent by weight of "R."

24. An electrode for an electrochemical cell as in claim 22, wherein the electrode further comprises up to about 10% by weight of a conductor material and up to about 5% by weight of a binder material.

25. An electrode for an electrochemical cell, the electrode comprising an electrochemically active material represented by the formula Li$_x$R$_y$Ni$_{1-y}$O$_z$, wherein "R" is at least one of scandium and a Period 5 transition metal having an atomic number between 39 and 42, "x" is initially between 0.95 and about 1.05, "y" is between about 0.02 and about 0.30, and "z" is about 2 and the material having a crystalline structure corresponding to an α-NaCrO$_2$ structure.

26. An electrode for an electrochemical cell as in claim 25, wherein the material is characterized in having layers according to the α-NaCrO$_2$ structure upon charging after "x" becomes less than 0.50.

27. An electrode for an electrochemical cell as in claim 25, wherein the material is characterized in having layers according to the α-NaCrO$_2$ structure upon charging after "x" becomes 0.40 or less.

28. An electrode for an electrochemical cell as in claim 25, wherein "y" is between about 0.05 and about 0.15.

29. An electrode for an electrochemical cell as in claim 25, in "y" is about 0.1.

30. The electrode material for an electrochemical cell as in claim 25, wherein the electrode material further comprises up to about 10% by weight of a conductor material and up to about 5% by weight of a binder material.

31. An electrochemical cell comprising a negative electrode, an electrolyte and a positive electrode, the positive electrode comprising a compound represented by the formula Li$_x$R$_y$Ni$_{1-y}$O$_z$, wherein "R" is at least one of scandium and a Period 5 transition metal having an atomic number between 39 and 42, "x" is initially between about 0.95 and about 1.05, "y" is between about 0.02 and about 0.30, and "z" is about 2 and said compound having a crystalline structure corresponding to an α-NaCrO$_2$ structure.

32. A composition of matter represented by the formula Li$_x$R$_y$Ni$_{1-y}$O$_z$, wherein "R" comprises at least one non-transition metal selected from the group consisting of aluminum, gallium, tin and zinc, "x" is initially between about 0.95 and about 1.05, "y" is between about 0.05 and about 0.15, and "z" is about 2 and the composition having a crystalline structure corresponding to an α-NaCrO$_2$ structure.

33. A composition of matter represented by the formula Li$_x$R$_y$Ni$_{1-y}$O$_z$, wherein "R" is at least one of scandium, yttrium, niobium, and molybdenum, "x" is initially between about 0.95 and about 1.05, "y" is between about 0.02 and about 0.30, "z" is about 2, and the composition having a crystalline structure corresponding to an α-NaCrO$_2$ structure.

* * * * *